(12) United States Patent
Uchihashi et al.

(10) Patent No.: US 6,380,694 B1
(45) Date of Patent: Apr. 30, 2002

(54) VARIABLE STRUCTURE CIRCUIT TOPOLOGY FOR HID LAMP ELECTRONIC BALLASTS

(75) Inventors: Kiyoaki Uchihashi, Hyogo (JP); Pradeep Kumar Nandam, Plano, TX (US)

(73) Assignee: Matsushita Electric Works R & D Laboratory, Woburn, MA (US)

( * ) Notice: Subject to any disclaimer, the term of this patent is extended or adjusted under 35 U.S.C. 154(b) by 0 days.

(21) Appl. No.: 09/667,549

(22) Filed: Sep. 22, 2000

(51) Int. Cl.[7] .............................................. H05B 37/00
(52) U.S. Cl. ...................... 315/244; 315/224; 315/307
(58) Field of Search ............................ 315/244, 209 R, 315/224, 225, 291, 307, DIG. 2, DIG. 7

(56) References Cited

U.S. PATENT DOCUMENTS

| | | | |
|---|---|---|---|
| 4,904,907 A | | 2/1990 | Allison et al. ............... 315/307 |
| 4,912,374 A | | 3/1990 | Nagase et al. ............... 315/244 |
| 5,118,996 A | * | 6/1992 | El-Hamamsy et al. ...... 315/248 |
| 5,381,076 A | * | 1/1995 | Nerone .................... 315/209 R |
| 5,428,268 A | | 6/1995 | Melis et al. ................. 315/247 |
| 5,677,602 A | * | 10/1997 | Paul et al. ................... 315/224 |
| 5,932,976 A | | 8/1999 | Maheshwari et al. ........ 315/291 |
| 6,075,326 A | * | 1/2000 | Nostwick ..................... 315/307 |
| 6,020,691 A | | 2/2000 | Sun et al. .................... 315/307 |
| 6,144,172 A | | 11/2000 | Sun ............................. 315/291 |

* cited by examiner

Primary Examiner—Don Wong
Assistant Examiner—Thuy Vinh Tran
(74) Attorney, Agent, or Firm—Greenblum & Bernstein, P.L.C.

(57) ABSTRACT

A high intensity discharge (HID) lamp driving circuit. The HID lamp driving circuit includes a first pair of switching devices connected to a high frequency resonant filter, and a second pair of switching devices connected to a ripple reducing filter. A HID lamp is connected between the first pair of switching devices and second pair of switching devices, with a dc power supply being connected to the first pair of switching devices and the second pair of switching devices. The first pair of switching devices and the second pair of switching devices are connected to a common ground with the dc power supply. The lamp driving circuit operates in a half bridge topology during a start-up operation mode of the lamp, and operates in a full-bridge topology during a steady-state operation mode of the lamp. The HID lamp driving circuit is operated in an active zero current switching scheme.

15 Claims, 7 Drawing Sheets

Figure 1a.        Prior Art

No-Load (Lamp Starting)

Steady-State (Lamp On)

VARIABLE STRUCTURE CIRCUIT TOPOLOGY FOR HID LAMP ELECTRONIC BALLASTS

BACKGROUND OF THE INVENTION

1. Field of the Invention

The present invention relates to a variable structure circuit topology for high intensity discharge (HID) lamp electronic ballasts.

2. Description of Background Information

In electronic high intensity discharge lamp ballasts, there are two distinctly different methods to drive the lamp. The first method is to drive the lamp with high frequency sinusoidal current, and the second is to drive the lamp with low frequency rectangular current. The high frequency sinusoidal current method tends to give rise to acoustic resonance. Accordingly, low frequency rectangular current wave operation remains the favored technique for electronic high intensity discharge lamp ballasts because of the acoustic resonance problem associated with the high frequency method.

Two fundamental approaches are generally taken to generate a low frequency (less than 1 kHz) rectangular current with very small high frequency ripple to the lamp, as shown in comparative examples in FIGS. 1a and 1b. FIG. 1a shows a buck power regulator with pulse ignition in discontinuous inductor current mode, including switching element, inductor, diode and capacitor. In this case, the current in the inductor has very large triangular high frequency ripple.

U.S. Pat. No. 5,428,268 to Melis et al., issued Jun. 27, 1995, describes one implementation substantially corresponding to the example of FIG. 1a. As shown in FIG. 5A of Mehlis et al., the average part of the inductor current goes to the lamp, while the AC part of the inductor current is filtered by a capacitor C20 across the lamp. The patent to Melis et al. includes no specific mention of the actual values of capacitance C20 and inductance L20. However, to sufficiently filter the AC high frequency current to be below an acceptable level, and to maintain discontinuous mode operation for switching efficiency, the capacitance C20 has to be very large and the inductance L20 has to be quite small. The characteristic impedance of the circuit is low because of the large value of capacitance C20 and small value of inductance L20. It is known that the resonant voltage can be approximated by the characteristic impedance multiplied by the resonant current. Accordingly, generation of a high ignition voltage using the resonant method necessarily suffers from high circulating resonant current in the resonant elements and driving source switches. For example, when C is equal to 0.47 $\mu$F, L is equal to 890 $\mu$H, and Vp is equal to 3 $kV_{peak}$, the resonant current will be 69 $A_{peak}$. Obviously, the pulse method as disclosed in Melis et al. is the only logical method to ignite the lamp for the circuit arrangement and for the mode of operation disclosed therein.

The disadvantages of pulse mode ignition are clearly explained in commonly assigned U. S. Pat. No. 5,932,976. FIG. 1b of the present application shows a comparative example of a buck power regulator with high frequency resonant ignition, similar to that of U.S. Pat. No. 5,932,976, and with continuous inductor current mode. Shown in FIG. 1b are switches Q1, Q2; diodes D1–D4, inductor L1, and capacitors C1, Ca and Cb. In this case, the current in the inductor L1 has a very small triangular high frequency ripple superimposed on the low frequency rectangular current. Both the average part of the inductor current and the AC part of the inductor current flow through the lamp LMP. The parallel capacitor C1 with small capacitance is present only for the purpose of generating ignition voltage, and the burden of filtering the high frequency ripple is almost entirely on the inductor L1. The disadvantages of this arrangement become apparent when it is considered that the high frequency attenuation is only −20 dB/decade (logarithmic decade) for frequencies above the corner frequency (the corner frequency being formed by the lamp LMP impedance and the inductance L1). To achieve ripples low enough to avoid any acoustic resonance problems, the physical size of the inductor L1, and the inductance itself, must be fairly large. A side effect of large inductance is an increased glow-to-arc transition time. Another disadvantage of this arrangement is that the switching elements Q1, Q2 are in hard switching mode during the switch turn-on interval. The necessary switches are expensive because external ultra-fast freewheeling diodes in the order of 20–50 nS reverse recovery time are required. Moreover, switching losses are relatively high.

U.S. Pat. No. 4,904,907 to Allison et al., issued Feb. 27, 1990, discloses a modification of the continuous mode operation discussed above, in which (as shown in FIG. 5 of Allison et al.) an LC parallel resonant network (part of T301 and C304, C305 combination) is inserted into the buck inductor (part of T301). The inserted LC parallel resonant network has a resonant frequency at the buck operating frequency, and the fundamental frequency of the buck power regulator is attenuated significantly. A drawback of the circuit of Allison et al. is that the attenuation factor is highly sensitive to the frequency variation of the buck converter.

For example, the impedance of an LC parallel network can be calculated as:

$$Z_p(w) = \left| \frac{wLp}{\left\{1 - \left(\frac{w}{wp}\right)^2\right\}} \right| \qquad (1)$$

where wp is the parallel LC resonant frequency. The impedance at 1% and 3% deviations from the resonant frequency is $Z_p$=(1.01 wp)=50.2 and $Z_p$=(1.03wp)=16.9, respectively. It can been seen that a 2-percentage point variation in the operating frequency will cause the attenuation impedance to vary by a factor of 3, which in turn will cause the high frequency ripple to be attenuated by almost the same factor.

In the above mentioned two patent disclosures (U.S. Pat. Nos. 5,428,268 and 4,904,907), two stages of conversion are required to regulate the power and to supply a rectangular current to the lamp. The first stage regulates the lamp power and limits the current in the lamp during warm-up phase. The high frequency ripple is also attenuated by the filters in the first stage. The second stage is a fall bridge inverter that takes the DC output from the buck regulator and converts the DC output to a low frequency rectangular current (AC) for the lamp. A pulse ignition circuit is invariably required to ignite the lamp.

U.S. Pat. No. 4,912,374 to Nagase et al., issued Mar. 27, 1990, discloses a high frequency resonant ignition technique, although such is not the primary subject matter of this patent and is not specifically mentioned therein. In this topology, e.g., FIGS. 1 and 3 of Nagase et al., the power control stage and the inverter stage are combined in a half bridge/full bridge topology. The power control stage is combined with the output inverter, and in order to prevent acoustic resonance, the output inductor L1 and the capacitor C1 across the lamp must provide sufficient filtering to keep the high frequency component of the lamp current to a minimum. Consequently, the capacitance C1 is large, in the order of 1/10 micro-farads (µF). When this arrangement is operated at a high frequency and the lamp is OFF, the resonant circuit formed by the inductor and capacitor produces a high voltage to ignite the lamp. Very large circulating current flows in the circuit because of the large capacitance value and the relatively smaller inductance value. When the lamp is in high frequency operation, high frequency current is produced in the lamp. During the low frequency mode, the switching pattern is changed to one that would control the lamp power and limit the lamp current. Fundamentally, the disclosure of Nagase et al. has the same disadvantages as the comparative example of FIG. 1a of the present disclosure in discontinuous mode operation, except that resonant ignition is implied.

U.S. Pat. No. 6,020,691 to Sun et al., issued Feb. 1, 2000, discloses a driving circuit for high intensity discharge lamp electronic ballast. FIG. 2 illustrates a schematic diagram of the Sun circuit that addresses some of the problems associated with the demand for high circulating current for resonant ignition, low efficiency if operated in continuous mode, ripple sensitivity to the operating frequency, and the need for pulse ignition.

The design for the first stage L-C filter is intricately coupled to the second stage L-C filter. One is forced to choose the first stage LC filter resonant frequency to be much lower than the second stage LC filter resonant frequency. This implies larger circuit components—increasing cost, size, and weight. On the other hand, zero current switching (ZCS) for higher circuit efficiency is achieved passively. That is, ZCS is possible because of the choice of the inductor L1 and the operating frequency rather than active switching of Q1 and Q2. This places a restriction on the choice of these two important circuit parameters. Another significant problem is the position of the circuit ground. In order to accurately sense the lamp circuit, the ground is chosen as the center point of the two bus capacitors. Consequently, the input power factor correction circuit ground and the output stage ground are at different potentials. Hence, level shifting circuits, and opto-isolators, become necessary, thus making the device more expensive and less reliable. In addition, as average lamp current is being sensed, instantaneous protection of the switching devices in extreme load conditions, and transient modes of operation, is not possible. To make matters worse, as the lamp is operated in the steady-state with the circuit in a half-bridge configuration, the dc bus voltage needed is quite high. This contributes to higher switching losses and lower efficiency. Even if zero current switching is employed, the output capacitance devices (Power MOSFETS) contribute to switching losses, and these losses increase at higher bus voltages.

SUMMARY OF THE INVENTION

The present invention is directed to a high intensity discharge (HID) lamp driving circuit topology which provides active zero current switching while overcoming the problems associated with the prior art.

According to an object of the present invention, a high intensity discharge (HID) lamp driving circuit is transitionally operable in a lamp starting mode and a lamp running condition. The HID lamp driving circuit comprises a pair of inductor/capacitor filters that are connected to a high intensity discharge lamp in a bridge manner that is alternately operated as one of a ripple reducing filter and a resonant filter; a plurality of switching devices, such as, for example, high frequency switching devices, that are connected with the pair of inductor/capacitor filters; and a power source that provides a voltage to the lamp through the plurality of high frequency switching devices and alternately through one inductor/capacitor filter of the pair of inductor/capacitor filters.

According to an advantage of the present invention, the switching devices may be MOSFET transistors. Each MOSFET transistor may include an integrated high speed diode.

According to another advantage of the present invention, the driving circuit operates in a half-bridge topology during the lamp-starting mode, and a full-bridge topology during the lamp-running mode.

A feature of the present invention is that two switching devices of the plurality of switching devices and one inductor/capacitor filter of the pair of inductor/capacitor filters operate as a high frequency resonant mode switch to turn ON the lamp. The high frequency resonant mode switch is turned ON for a predetermined period of time after a lamp breakdown to provide a smooth transition from when a glowing condition to an arcing condition.

Another feature of the present invention is that one inductor/capacitor filter of the pair of inductor/capacitor filters comprises a high frequency resonant filter during the lamp starting mode, while a remaining inductor/capacitor filter of the pair of inductor/capacitor filters comprises a high frequency ripple reducing filter during the lamp running condition. It is noted that the high frequency resonant filter may comprise one or more (such as, for example, two) capacitors.

A still further advantage of the present invention is that the plurality of switching devices are controlled in an active zero current switching scheme.

According to another object of the present invention, a high intensity discharge (HID) lamp driving circuit, comprises a first pair of switching devices connected to a high frequency resonant filter; a second pair of switching devices connected to a ripple reducing filter; a HID lamp connected between the first pair of switching devices and the second pair of switching devices; a dc power supply connected to the first pair of switching devices and the second pair of switching devices, wherein the first pair of switching devices and the second pair of switching devices are connected to a common ground with the dc power supply. The first switching device operates in a half-bridge topology during a start-up operating mode of the lamp, while the second switching device operates in a full-bridge topology during a steady-state operating mode of the lamp.

According to an advantage of the present invention, the first and second pairs of switching devices comprise high frequency switches, such as, for example, MOSFET transistors.

BRIEF DESCRIPTION OF THE DRAWINGS.

The present invention is further explained in the description which follows with reference to the drawings, illustrating, by way of non-limiting examples, various embodiments of the invention, with like reference numerals representing similar parts throughout the several views, and wherein:

FIG. 1a shows a block diagram of a discontinuous current mode high intensity discharge lamp ballast;

DETAILED DESCRIPTION OF THE EMBODIMENTS

Figure 1B:
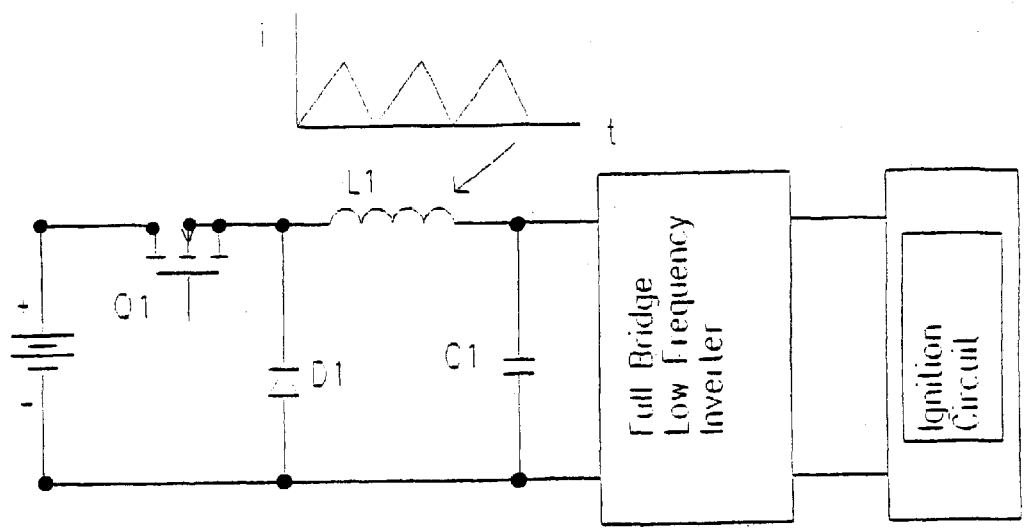
FIG. 1b shows a block diagram of a continuous current mode high intensity discharge lamp ballast.
Figure 1B:
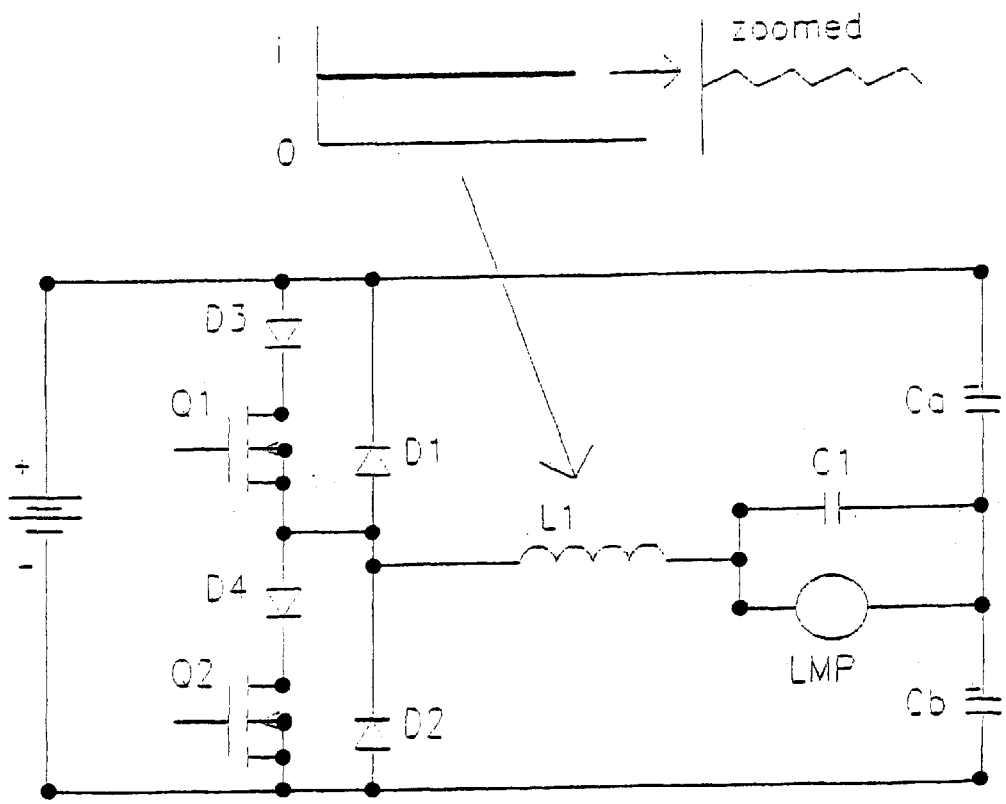
Figure 2:
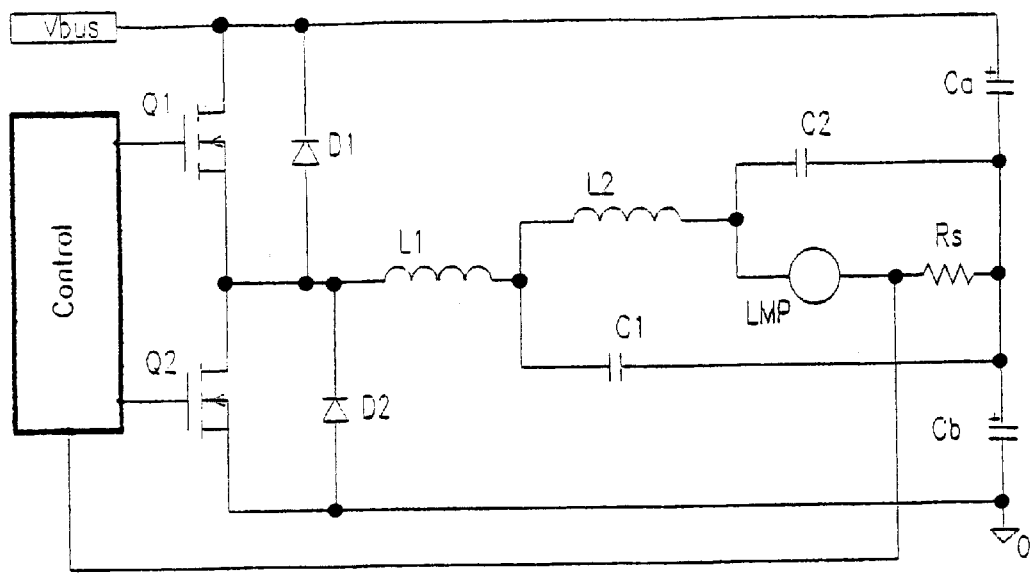
FIG. 2 shows a basic schematic diagram of a known driving circuit for a high intensity discharge lamp electronic ballast.
Figure 3A:
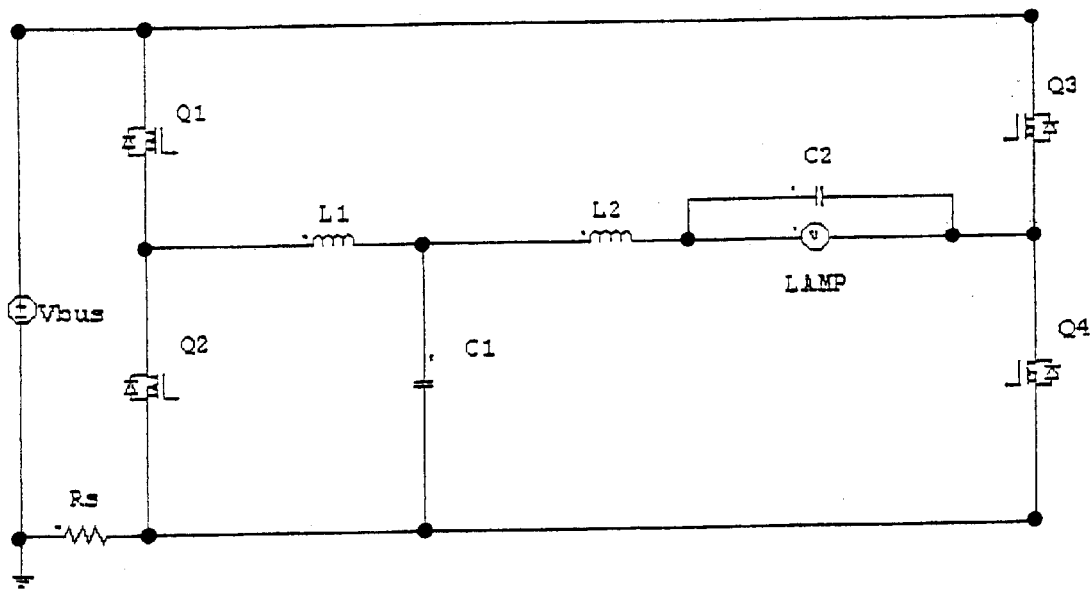
FIG. 3a shows a basic schematic diagram of a circuit according to the present invention.

FIG. 3a illustrates one embodiment of the present invention. As shown in FIG. 1, the drive circuit includes a power source Vbus that is operated through a circuit control (not shown). The circuit of FIG. 3a also illustrates four high frequency switching devices Q1, Q2, Q3, and Q4 which are connected to the power source Vbus. In the disclosed embodiment, high frequency switching devices Q1 to Q4 comprise a high frequency semiconductor device, such as, for example, a MOSFET transistor. However, it is understood that alternative semiconductor devices, such as, for example, a bipolar transistor, may be used without departing from the scope and/or spirit of the instant invention. In the illustrated embodiment of FIG. 3a, switching devices Q1 to Q4 are shown as high frequency MOSFET devices. Preferably, each high frequency MOSFET device includes an integrated high speed diode. However, it is understood that the diode may be external to the MOSFET device, without departing from the scope and/or spirit of the invention.

Connected between switching devices Q1 and Q2 is an electrical line including inductors L1 and L2 connected in series. Between inductors L1 and L2 is an electrical line that includes a capacitor C1. One side of capacitor C1 is connected between inductors L1 and L2, while the other side of capacitor C1 is connected to ground through resistor Rs. A second capacitor C2 is connected in parallel with the lamp after inductor Ace L2. Switches Q3 and Q4 are connected to the other side of the lamp. Switching devices Q2 and Q4 are arranged such that one side is connected to ground through resistor Rs.

Inductor L2 and capacitor C2 form a resonant filter that functions to ignite the lamp to turn it ON. During the lamp starting mode of operation, switching devices Q1 and Q2 are turned OFF. Therefore, inductor L1, switching device Q1 and switching device Q2 play no role during the starting mode. As a result, inductor L2 and capacitor C2 can be activated independently. That is, during the starting mode of operation, the resonant filter (formed by inductor L2 and capacitor C2) are "de-coupled", and are effectively out-of-the-circuit (isolated) from inductor L1 and capacitor C1.

Figure 3B:
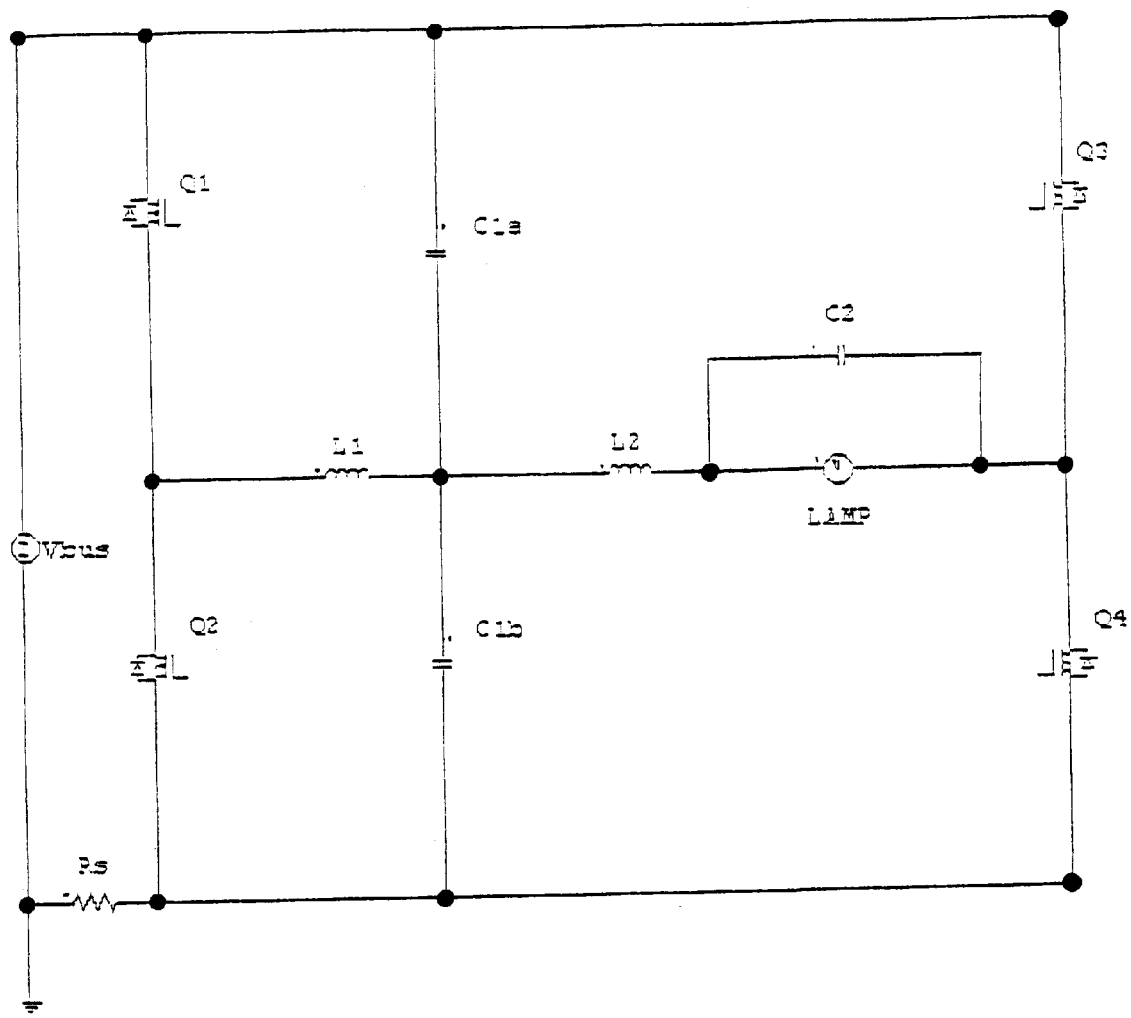
FIG. 3b shows a basic schematic diagram of an alternative circuit according to the present invention.

FIG. 3b illustrates another embodiment of the present invention. In this embodiment, an additional capacitor C1b is provided to yield a better sensing of the lamp circuit. During the starting mode, capacitors C1a and C1b function as the capacitors of a half bridge circuit. In conjunction with switching devices Q3 and Q4, the circuit forms a half bridge circuit topology. Switching devices Q3 and Q4 are switched near the resonant frequency of the resonant filter formed by inductor L2 and capacitor C2. A switching frequency can be varied around a nominal resonant frequency of the resonant filter.

Figure 3C:
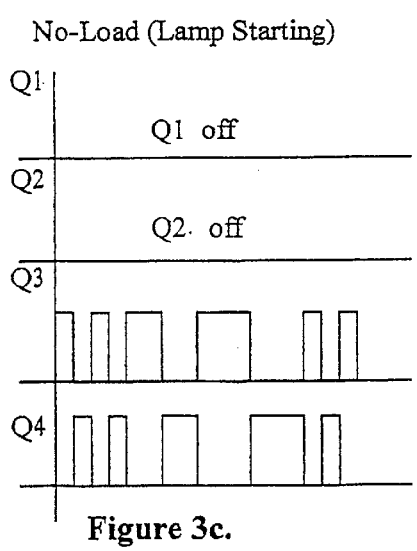
FIG. 3c shows a basic schematic diagram of a gate drive switching scheme according to the present invention.
Figure 3C:
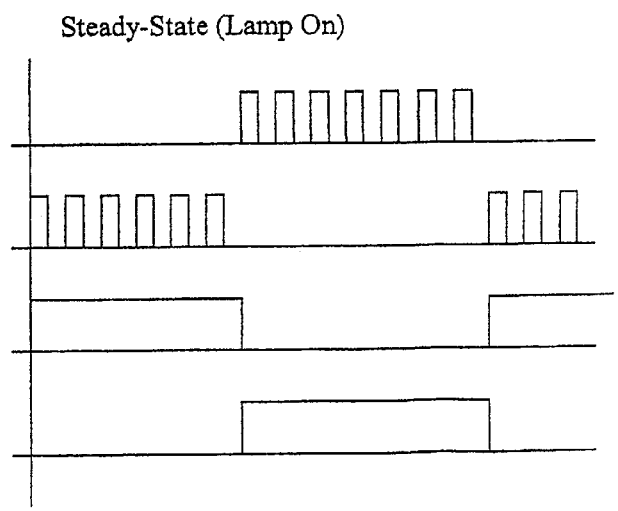

FIG. 3c illustrates a type of switching scheme contemplated for the present invention, including the frequency modulation during a starting of the lamp. Frequency modulation addresses the tolerances on the circuit components and also ensures that the switching frequency is not maintained too close to the resonant frequency. Consequently, high peak voltages (near approximately 3 kV) which ignite the HID lamp, are generated without danger of those voltage peaks being too high.

Figure 4:
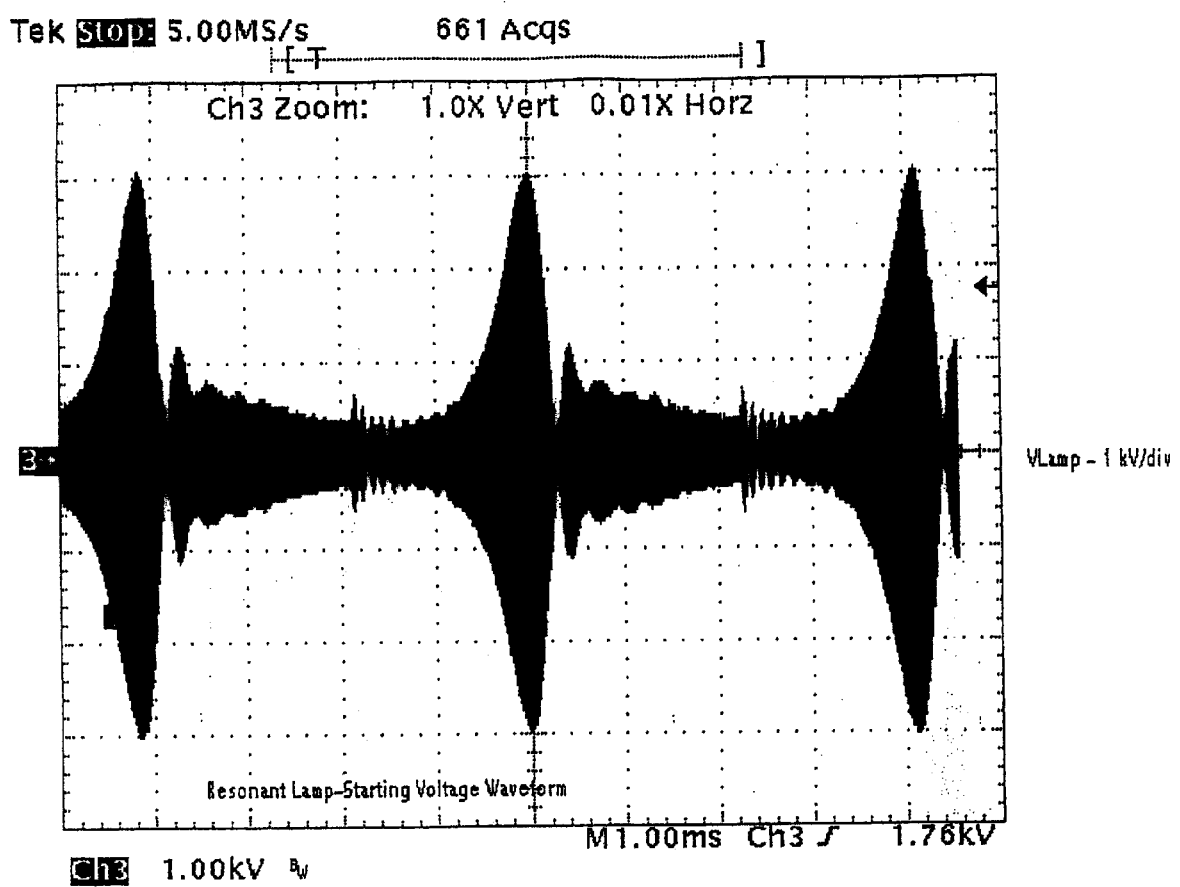
FIG. 4 shows a high frequency ignition voltage envelope generated by the L2-C2 resonant filter, when Q3 and Q4 are switched near the resonant frequency.

FIG. 4 illustrates a waveform of the resonant ignition lamp voltage generated by the current invention when the HID lamp is operated in the starting mode. It is noted that it is possible to ignite the lamp at a fixed frequency close to the resonant frequency of the resonant filter.

Subsequent to lamp breakdown, the control circuit continues with the resonant frequency scheme, as shown in FIG. 3c, for a predetermined period of time that can be set, for example, by an associated control logic or timer (not illustrated). Such controllers (such as, for example, illustrated in U.S. Pat. No. 5,932,976) are known by those skilled in the art, and thus, are not described herein. This permits a smooth transition from a glowing of the lamp (which occurs when the lamp is ignited in the starting mode of operation) to an arcing of the lamp (which occurs when the lamp is operating in the normal mode of operation). Moreover, should the lamp extinguish after breaking down, the resonant igniter will resume generating the 3 kV pulses across the lamp.

After the lamp is turned ON, and after a successful glow-to-arc transition, the switching scheme is changed to the normal mode of operation. In the normal (e.g., lamp running condition) operation mode, switching devices Q1 and Q2 are alternately turned ON and OFF at a predetermined high frequency (such as, but not limited to, for example, approximately 75 kHz), while switching devices Q3 and Q4 are turned ON and OFF at a predetermined low frequency (such as, but not limited to, for example, approximately 200 Hz) that is preferably approximately equal to a desired operating frequency (e.g., approximately 200 Hz) of the lamp voltage and current waveform, as shown in FIG. 3c.

At this point, the circuit functions like a standard full bridge circuit. In one-half of the low frequency (e.g., approximate 200 Hz) cycle, switching device Q1 is alternately turned ON and OFF at a high frequency, near, but not limited to, for example, approximately 75 kHz, while switching device Q4 is turned ON. Switching devices Q2 and Q3 are turned OFF throughout this half of the cycle. During the other half of the cycle, switching devices Q1 and Q4 are turned OFF, and switching devices Q2 and Q3 are turned ON. In the disclosed embodiments, switching device Q2 comprises a high frequency switch and switching device Q3 comprises a low frequency switch. However, it is understood that variations therein may be made without departing from the scope and/or spirit of the invention.

Figure 5:
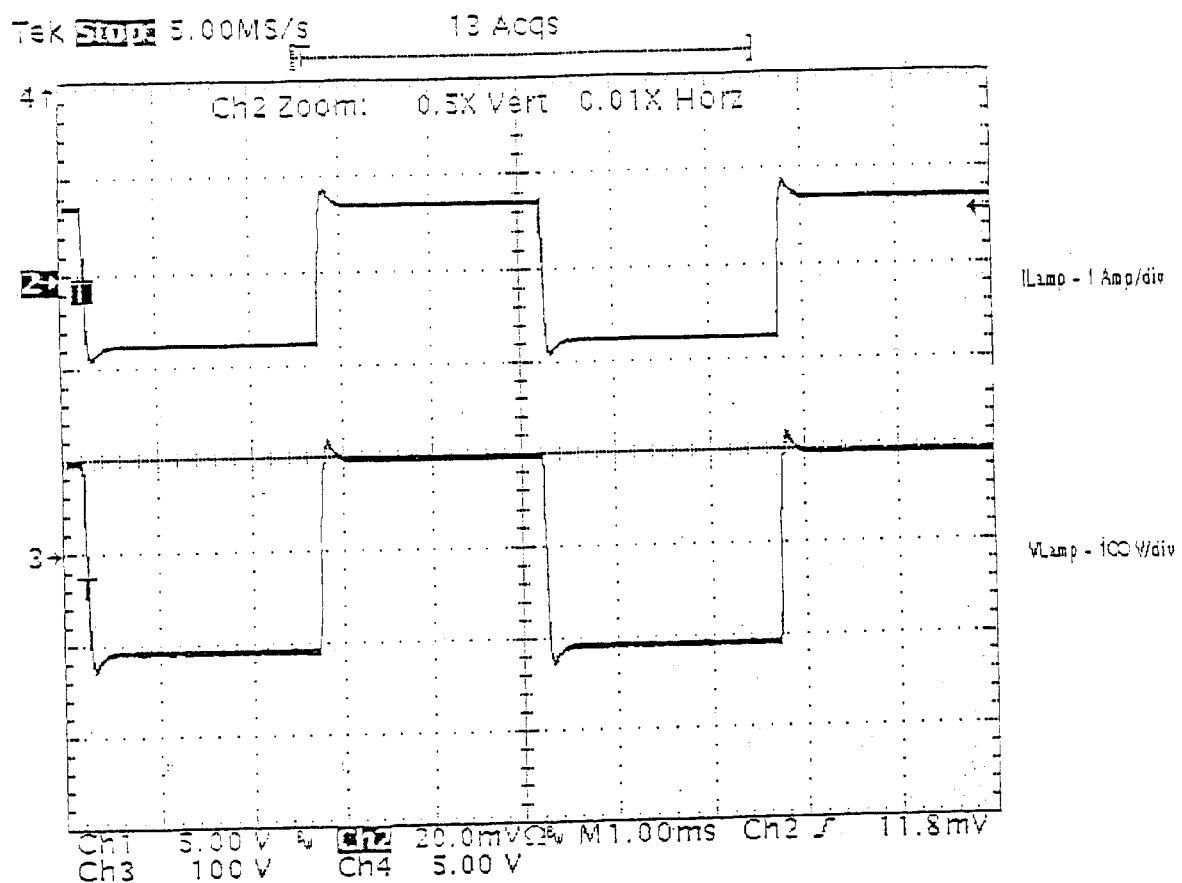
FIG. 5 shows the rectangular lamp current and lamp voltage in steady-state operation.

FIG. 5 illustrates waveforms of the lamp current and voltage during the normal (steady-state) operation mode.

A pulse width of the high frequency switching devices Q1 and Q2 is determined in a closed loop control by sensing the lamp voltage. For example, this voltage can be differentially sensed directly across the lamp terminals. Alternatively, the voltage change can also be sensed across capacitor C1 or C1b, as shown in FIGS. 3a and 3b. When the lamp voltage is sensed across capacitor C1b, the voltage across this capacitor is equal to Vlamp only during one-half cycle of the starting mode waveform where switching devices Q1 and Q4 are turned ON. Thus, information from only the one-half cycle is used by the control circuit. This is adequate, because the voltage loop is a very low bandwidth loop. By determining the pulse width in the closed loop, a turn-off instant of either switching device Q1 or switching device Q2 is determined.

The point in time (e.g., instant) that switching devices Q1 and Q2 is turned ON is determined using an active zero current switching scheme (ZCS), which is known to those skilled in the art, and thus, not described in detail herein. Active ZCS has a very high efficiency, close to approximately 95%, with respect to the output stage. The junction potential of switching devices Q1 and Q2 (e.g., the terminal of inductor L1 connected to switching devices Q1 and Q2) is monitored (sensed), and that potential is used to determine the instant the ZCS occurs, to turn ON either switching device Q1 or switching device Q2.

Figure 6:
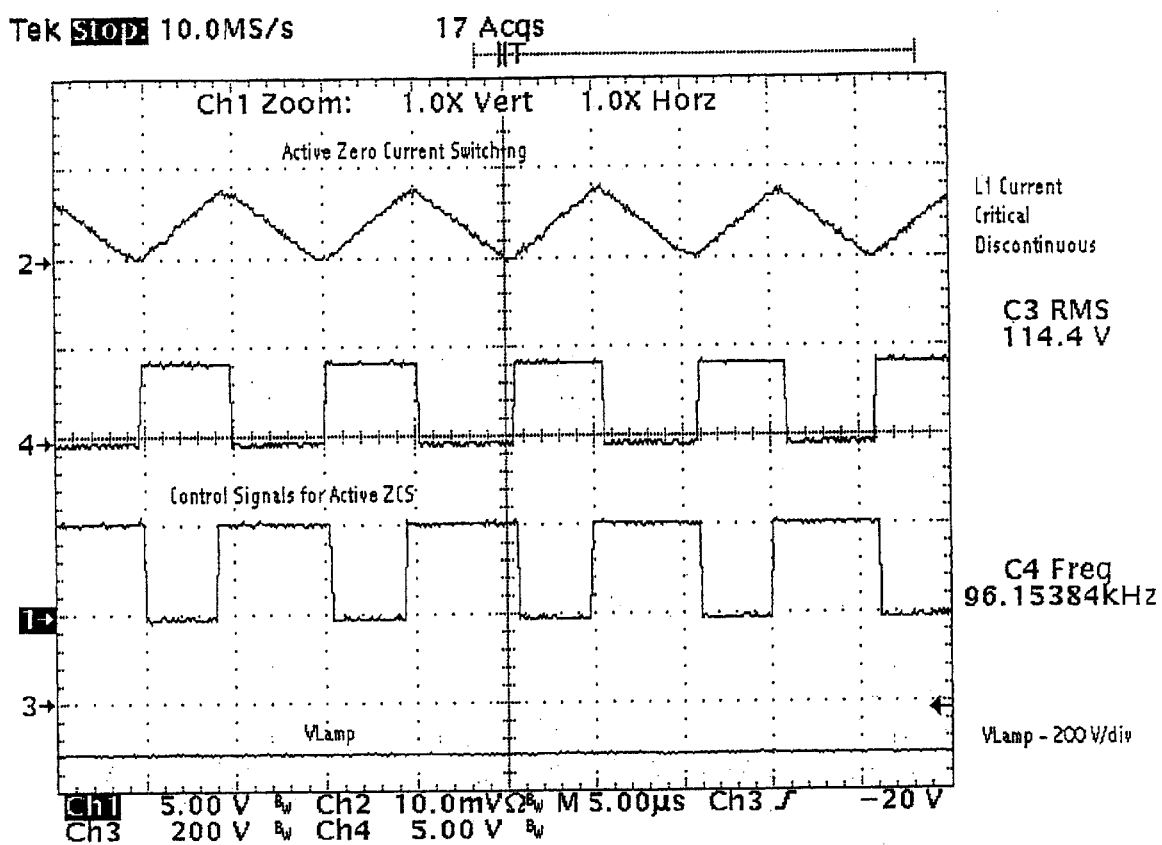
FIG. 6 shows the ZCS/critical-discontinuous current waveform in inductor L1.

The advantage of active ZCS (critical discontinuous current operation) of inductor L1 will now be explained. When switching device Q1 is ON, the current ramps up to a predetermined set level that is determined by the feedback loop. Switching device Q1 is then turned OFF. Since the current in inductor L1 cannot change abruptly, the current continues to flow through the body diode of switching device Q2, until the current in inductor L1 becomes zero. At this point, switching device Q1 is turned ON again. Thus, current in switching device Q1 begins to ramp up from zero. This mode of operation for switching device Q1 is referred to as the active ZCS scheme, and is shown in FIG. 6. Active ZCS ensures no dead time, which in turn ensures a clean and linear voltage sense signal. This operation is important for a closed loop control based on the lamp voltage sensing signal. The same is true for switching device Q2 when it is in active switching. Ideally, ZCS has a zero loss during the switching turn ON interval, which increases the efficiency of the circuit.

Although the above description sets forth particular embodiments of the present invention, modifications of the invention will be readily apparent to those skilled in the art, and it is intended that the scope of the invention be determined solely by the appended claims.

What is claimed is:

1. A high intensity discharge (HID) lamp driving circuit transitionally operable in a lamp starting mode and a lamp running condition, comprising:
   a pair of inductor/capacitor filters connected to a high intensity discharge lamp in a bridge manner that are alternately operated as one of a ripple reducing filter and a resonant filter;
   a plurality of switching devices connected with the pair of inductor/capacitor filters; and
   a power source that provides a voltage to the lamp through said plurality of high frequency switching devices and alternately through one inductor/capacitor filter of said pair of inductor/capacitor filters.

2. The HID lamp driving circuit of claim 1, wherein said plurality of switching devices comprise a plurality of high frequency switching devices.

3. The HID lamp driving circuit of claim 1, wherein the driving circuit operates in a half-bridge topology during the lamp-starting mode.

4. The HID lamp driving circuit of claim 1, wherein the driving circuit operates in a full-bridge topology during the lamp-running mode.

5. The HID lamp driving circuit of claim 1, wherein two switching devices of said plurality of switching devices and one inductor/capacitor filter of said pair of inductor/capacitor filters operate as a high frequency resonant mode switch to turn ON the lamp.

6. The HID lamp driving circuit of claim 5, wherein said high frequency resonant mode switch is turned ON for a predetermined period of time after a lamp breakdown to provide a smooth transition from when a glowing condition to an arcing condition.

7. The HID lamp circuit of claim 1, wherein one inductor/capacitor filter of said pair of inductor/capacitor filters comprises a high frequency resonant filter during the lamp starting mode, a remaining inductor/capacitor filter of said pair of inductor/capacitor filters comprising a high frequency ripple reducing filter during the lamp running condition.

8. The HID lamp driving circuit of claim 7, wherein said high frequency resonant filter comprises two capacitors.

9. The HID lamp driving circuit of claim 1, wherein said plurality of switching devices comprise high frequency MOSFET transistors.

10. The HID lamp driving circuit of claim 9, wherein each high frequency MOSFET transistor includes an integrated high speed diode.

11. The HID lamp driving circuit of claim 1, wherein said plurality of switching devices are controlled in an active zero current switching scheme.

12. A high intensity discharge (HID) lamp driving circuit, comprising:
   a first pair of switching devices connected to a high frequency resonant filter;
   a second pair of switching devices connected to a ripple reducing filter;
   a HID lamp connected between said first pair of switching devices and said second pair of switching devices;
   a dc power supply connected to said first pair of switching devices and said second pair of switching devices, wherein said first pair of switching devices and said second pair of switching devices are connected to a common ground with said dc power supply.

13. The HID lamp driving circuit of claim 12, wherein said first pair of switching devices comprise a pair of high frequency switches, and wherein said second pair of switching devices comprise a pair of high frequency switches.

14. The HID lamp driving circuit of claim 12, wherein said first switching device operates in a half-bridge topology during a start-up operating mode of said lamp, said second switching device operating in a full-bridge topology during a steady-state operating mode of said lamp.

15. The HID lamp driving circuit of claim 12, wherein the HID lamp driving circuit operates in an active zero current switching scheme.

* * * * *